INVENTOR.
Robert C. Norrie

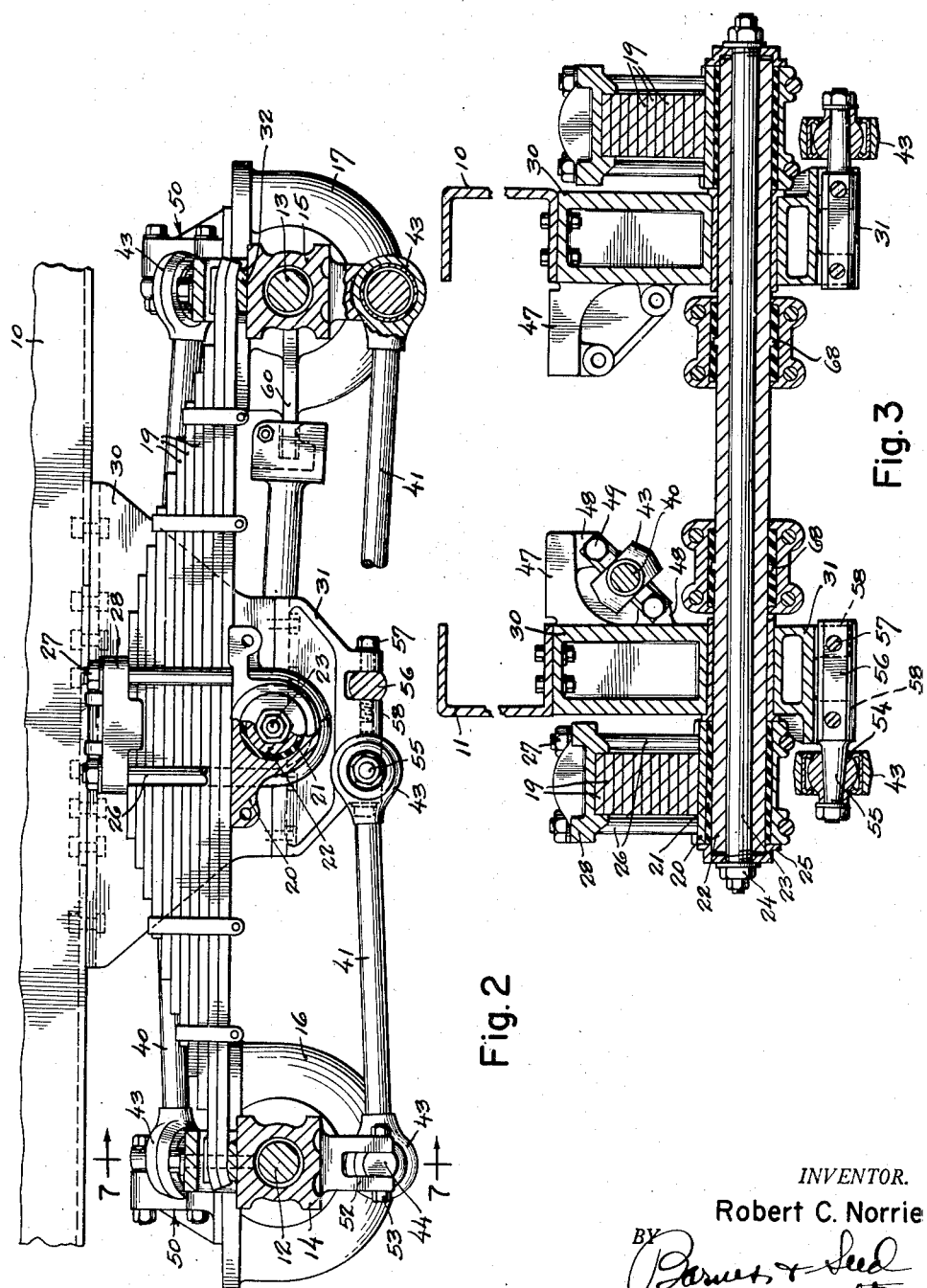

March 12, 1957  R. C. NORRIE  2,784,980
SPRING SUSPENSION FOR REAR AXLE BOGEYS
Filed Aug. 3, 1953  3 Sheets-Sheet 3

INVENTOR.
Robert C. Norrie

United States Patent Office 2,784,980
Patented Mar. 12, 1957

2,784,980

SPRING SUSPENSION FOR REAR AXLE BOGEYS

Robert C. Norrie, Seattle, Wash., assignor, by mesne assignments, to Pacific Car and Foundry Company, a corporation of Washington Application August 3, 1953, Serial No. 371,983

9 Claims. (Cl. 280—104.5)

This invention relates to spring suspension construction for rear axle bogeys, and pertains especially to rear axle bogey hook-ups of the type illustrated in U. S. Pat. No. 2,078,521, issued to H. W. Alden April 27, 1937, namely a hook-up including, at each side of the vehicle, multiple spring leaves bound in a stack and extending from one to the other rear axle with the center portion of the spring stack secured by a clamping bracket to the frame of the vehicle, and having as complements of the spring stacks sets of torque rods to establish fore and aft positioning of the rear axles, there being three such rods in each set two located below and one located above the horizontal plane occupied by the axles. These torque rods are of a corresponding length and lie parallel to one another with the outer ends being each joined by a universal connection with the front or rear bogey rear axle, as the case may be, and with the inner ends being each joined by a universal connection with the vehicle frame. In addition to establishing said fore and aft positioning of the axles, the rods prevent fore and aft tipping of the axles caused by driving and braking torques.

The present invention has for its object the provision of a bogey rear axle spring suspension perfected in the sense that there is provided an effective means independent of the spring stacks bracing the rear axle against lateral movement. By using the braced rear bogey axle as a means of positioning the rear ends of the two spring stacks my perfected suspension precludes the bracket which clamps the center portion of each spring stack to the frame from being subjected to twist. Bracing of the front bogey axle becomes unnecessary in that the positioning of each spring stack's rear end inherently positions the spring stack's front end, and the positioned front ends then act in concert to hold the front bogey axle against lateral movement.

Other more particular objects and advantages of the invention, will, with the foregoing, appear and be understood in the course of the following description and claims, the invention consisting in the novel construction and in the adaptation and combination of parts hereinafter described and claimed.

In the accompanying drawings:

Fig. 2 is a fragmentary longitudinal vertical sectional view on line 2—2 of Fig. 1, with the traction wheels deleted.

Fig. 3 is a transverse vertical sectional view on line 3—3 of Fig. 1.

Figure 1:
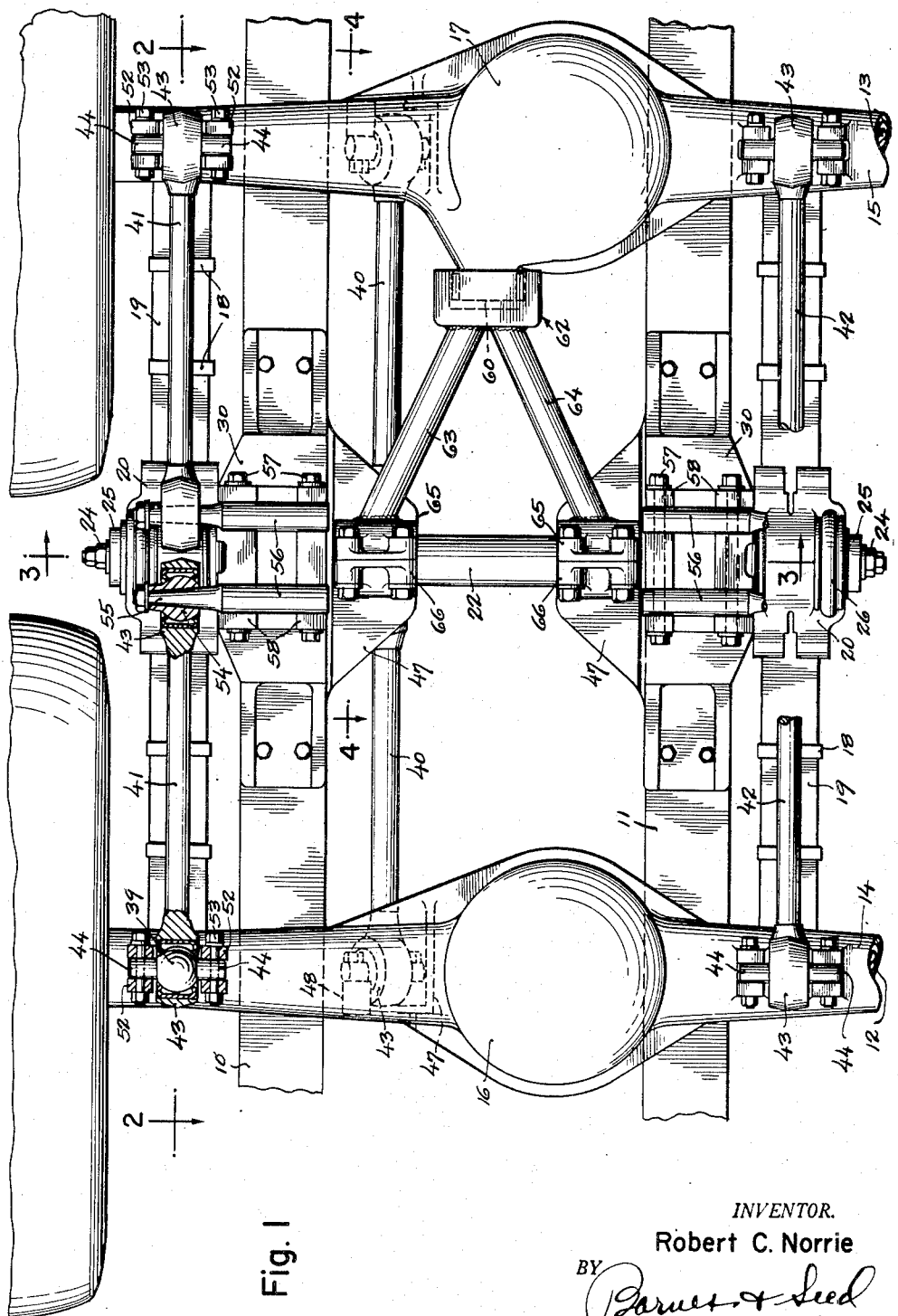
Figure 1 is a fragmentary underside plan view illustrating a rear axle bogey construction embodying the preferred teachings of the present invention.
Figure 4:
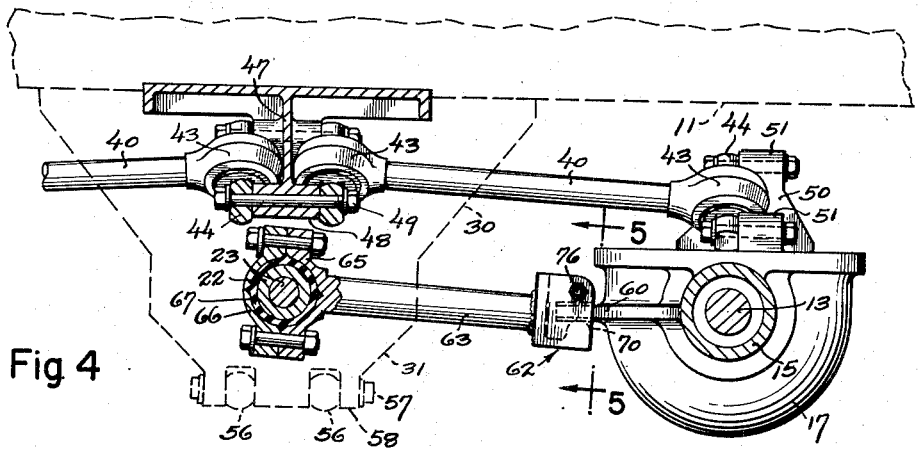
Fig. 4 is a fragmentary longitudinal vertical sectional view on line 4—4 of Fig. 1, again deleting the traction wheels.

Referring to said drawings the reference numerals 10 and 11 denote the two channel members customarily employed as longitudinal principals in the vehicle frame. 12 and 13 denote the front and rear axles of the vehicle's rear axle bogey, and 14 and 15 designate, respectively, the housings for such axles. While I have, for simplicity in illustration, omitted any showing of engine-driven drive shafts, one or both axles are or may be driven through the usual differential gearing contained in differential housings 16 and 17. The spring stacks which spring the axles from the main frame are composed of a plurality of leaves 19 bound by clips 18. At its midlength each stack seats upon a trunnion block 20 which, with an interposed bushing 21 of rubber or other suitable resilient material, fits over the projecting end of a through trunnion-shaft 22. A bolt 23 extends through the trunnion shaft and threaded onto the ends of the bolt are nuts 24 which bring retainer caps 25 snugly to bear against the trunnion blocks. The resilient bushings are brought under compression by pressure exerted from said caps. For shackling the spring leaves to the block there is employed the usual U-bolts 26 and associated nuts 27, the nuts finding a purchase against a cap member 28 saddling the spring stack. The trunnion shaft is made secure to the frame principals 10 and 11 by hangers 30 and complementing stirrup-caps 31.

The lower two leaves of each spring stack serve as main leaves and seat by their ends upon pads 32 which are welded to the top face of each of the two bogey rear axle housings. Vertically tapped bosses 33 are formed upon said axle housings at opposite sides of the seated spring ends, and a rebound retainer 34 bridges each of said seated spring ends and is secured in place by bolts 35 working in the tapped openings of the bosses. Pads 36 restrain the spring ends against lateral movement relative to the axle. Each rebound retainer presents a shelf extension 37 directed inwardly of the vehicle and surmounting this shelf in underlying relation to the frame principal 10 or 11, as the case may be, is a limit pad 38.

Two sets of three torque rods are provided in the assembly, with one set extending forwardly from a central frame mounting to the front bogey rear axle, and the other set extending rearwardly from a central frame mounting to the rear bogey rear axle, and the three rods in each set are of corresponding length lying parallel to one another and are positioned one rod 40 above and the other two rods 41 and 42 below the horizontal plane occupied by the two axles. Each of these several rods presents a bearing sleeve 43 at each of its two ends, and received in these sleeves are respective wrist pins. The wrist pins for the outer ends of the lower rods 41 and 42, and for both the inner and the outer ends of the upper rods 40, are substantially alike, presenting flat-sided trunnions 44 extending laterally from opposite sides of a ball-shaped journal 39, and these trunnions are each transversely bored to accommodate bolts which secure the wrist pins to the frame or to the axle, as the case may be. As respects the frame mounting, a bracket extension 47 integral with the hanger 30 presents a fork into which the sleeve 43 projects, and the two trunnions are secured to the fork-arms 48 by cap screws 49. The outer end mounting for the rod 40 employs much the same arrangement, the sleeve in this instance projecting into the opening of a fork 50 which surmounts the axle housing. The outer end mountings for the rods 41 and 42 include a respective pendant fork integral with the axle housing, and the fork arms 52 are themselves bifurcated. The trunnions fit in the slots of these bifurcated fork-arms and are secured thereto by bolts 53. For the inner ends of the lower rods 41 and 42, the arrangement is one in which the terminal sleeve has a ball-shaped fitting 54 journaled therein, and this fitting is carried upon the tapered outwardly projecting end 55 of a pin 56 secured by bolts 57 to pendent fork-arms 58 made integral with the stirrup-cap 31.

Proceeding now to a description of the brace, it will be seen that the rear bogey rear axle has a forwardly directed prong 60 made integral with its differential housing 17 to occupy a position on the approximate longitudinal median line of the vehicle, and engaging this prong is a box body 62 carried by two arms 63—64 placed angular to one another and each extending from the trunnion-shaft 22, or more properly from a respective split trunnion block whose saddle principal 65 and complementing cap 66 are clamped upon the trunnion-shaft with an elastic rubber bushing 67 interposed under compression between the same. Circumscribing collars 68 formed upon the trunnion-shaft and invested by the compressed rubber bushings localize the trunnion blocks against axial movement.

Figures 5, 6:
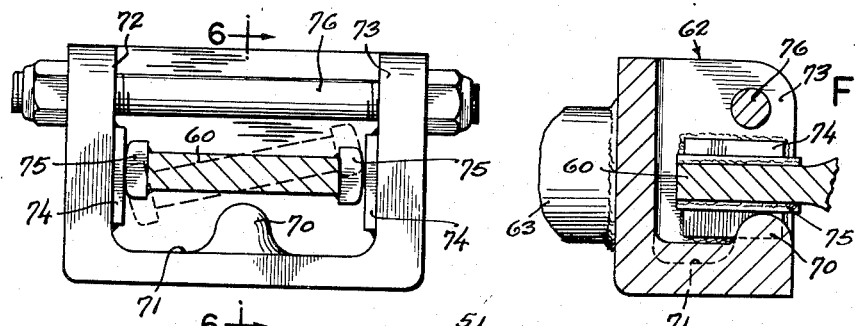
Fig. 5 is an enlarged scale detail transverse vertical sectional view on line 5—5 of Fig. 4.
Fig. 6 is a fragmentary longitudinal vertical sectional view on line 6—6 of Fig. 5.
Figure 7:
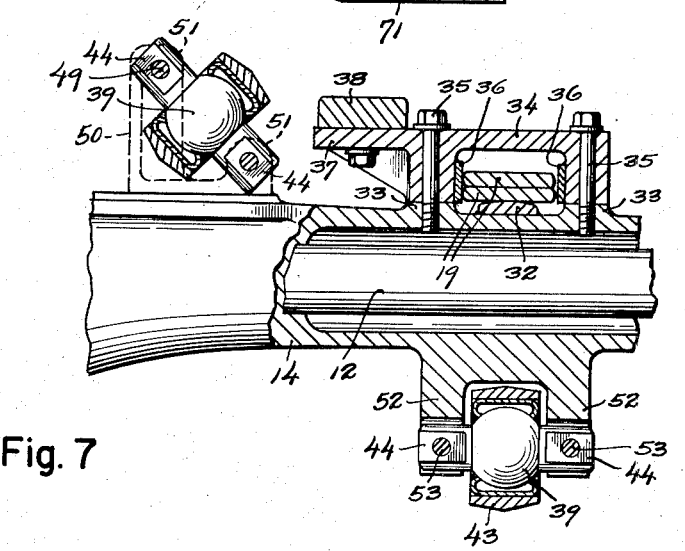
Fig. 7 is a fragmentary transverse vertical sectional view drawn to an enlarged scale on line 7—7 of Fig. 2.

The box body 62 is a special casting closed along the bottom, sides and back and providing a nodule 70 rising to a moderate height from the bottom wall 71 on the substantial longitudinal median line of the box body. The side walls 72—73 each have their inner surface faced with a wear pad 74. The prong 60 is in the nature of a flat tongue overlying the nodule and provided along each of its two sides with wear pads 75 arranged to brush the wear pads 74 (see Fig. 5). A removable bolt 76 spanning the access throat of said box body above the introduced prong serves the function of a keeper.

It will be apparent from the foregoing description that the triangular brace, bearing by its apical box 62 upon the prong 60, holds the rear bogey rear axle 15 against lateral movement. This imposed restraint enables the rear bogey rear axle to position the rear ends of both spring stacks against lateral movement, and the spring stacks then carry the imposed restraint forward to the forward axle of the bogey rear axle assembly. The center spring bracket, being relieved of twisting action, takes only vertical load.

It is thought that the invention will have been clearly understood from the foregoing detailed description of my now-preferred embodiment. Changes in the details of construction will suggest themselves and I accordingly intend that no limitations be implied and that the hereto annexed claims be given the broadest interpretation which the employed language fairly permits.

I claim:

1. In a tandem rear axle vehicle, in combination with the front and rear tandem rear axles, the vehicle main frame, and a frame-carried trunnion shaft extending transversely of the vehicle intermediate said axles, a multiple-leaf spring beam at each side of the vehicle journaled by its center portion upon the trunnion shaft, connections between the front and rear ends of each spring beam and the front and rear tandem rear axles, respectively, said connections positioning the spring ends against lateral movement relative to the axles, respective sets of at least three torque rods extending parallel with one another from the frame to each of the two tandem rear axles, one of the rods in each set occupying a position between the spring beams at one side of a horizontal plane common to the two tandem rear axles while the other two rods in each set occupy positions at the other side of said horizontal plane and also at opposite sides of the longitudinal vertical plane occupied by the first said rod, and a triangular brace extending from the trunnion shaft to at least one of said tandem rear axles and holding the related tandem rear axle against lateral movement, the triangular brace including two angularly disposed legs converging from the trunnion shaft toward the concerned tandem rear axle, the connection from each of said legs to the trunnion shaft comprising block and cap components of a pivot bearing.

2. In a tandem rear axle vehicle, in combination with the front and rear tandem rear axles, and the vehicle main frame, a multiple-leaf spring beam at each side of the vehicle having its center portion journaled from the frame for rocker movement about a transverse horizontal axis located intermediate the two tandem rear axles, connections between the front and rear ends of each spring beam and the front and rear tandem rear axles, respectively, respective sets of at least three torque rods extending parallel with one another from the frame to each of the two tandem rear axles, and means establishing a connection between the frame and at least one of said tandem rear axles holding the concerned tandem rear axle against lateral movement, said means comprising a triangular brace connected by its narrow end with the axle and having the wide end journaled from the frame for pivotal movements about an axis coinciding with the rocker axis of the spring beams, the connection from the narrow end of the brace to the concerned tandem rear axle being such as permits the end to cock itself relative to said axle, the connection between the axle and the brace comprising interacting elements one of which is rigid with the axle and the other of which is rigid with the brace, said elements comprising a longitudinally directed horizontal prong and a box body in which said prong is received.

3. The vehicle construction of claim 2 in which the body has a top access opening for said prong normally closed by a removable keeper.

4. Vehicle construction according to claim 3 in which the prong and the box admit to relative swivel motion about an axis normal to the axle.

5. In a tandem rear axle vehicle, in combination with the front and rear tandem rear axles and the vehicle main frame, a suspension hook-up at each side of the vehicle springing the ends of the front and rear axles from the frame and holding said axle ends to oscillatory movement in predetermined arcuate paths taken about transverse centers which are fixed relative to the frame, and means for holding said axles against lateral movement comprising a triangular brace connected by its narrow end with one of said axles and having the wide end journaled from the frame for pivotal movement about an axis coinciding with the center about which the concerned axle oscillates, the connection from said brace to the concerned tandem rear axle being such as allows the axle to cock itself relative to the brace, the connection with the axle from said narrow end of the triangular brace being comprised of a longitudinally directed horizontal prong rigid with one of said connected members and fitting in a box body rigid with the other of said connected members.

6. Structure according to claim 5 in which the frame journal for said triangular brace is composed of elastic rubber.

7. A construction according to claim 5 in which the box body has a top access opening for the prong normally closed by a removable keeper.

8. A construction according to claim 5 in which the prong admits to a moderate degree of vertical movement within the box body.

9. In a tandem rear axle vehicle, in combination with the front and rear tandem rear axles and the vehicle main frame, a suspension hook-up at each side of the vehicle springing the ends of the front and rear axles from the frame and holding said axle ends to oscillatory movement in predetermined arcuate paths taken about transverse centers which are fixed relative to the frame, and means for holding said axles against lateral movement comprising a triangular brace connected by its narrow end with one of said axles and having the wide end journaled from the frame for pivotal movement about an axis coinciding with the center about which the concerned axle oscillates, the journal connection for said wide end of the brace comprising block and cap components of axially spaced pivot bearings.

References Cited in the file of this patent

UNITED STATES PATENTS

| Number | Name | Date |
|---|---|---|
| 2,078,521 | Alden | Apr. 27, 1937 |
| 2,204,087 | Konetsky | June 11, 1940 |
| 2,239,286 | Freitag | Apr. 22, 1941 |
| 2,300,844 | Olley | Nov. 3, 1942 |
| 2,639,166 | Jones | May 19, 1953 |
| 2,713,498 | Brown | July 19, 1955 |